US012219319B2

(12) United States Patent
Olmos et al.

(10) Patent No.: US 12,219,319 B2
(45) Date of Patent: Feb. 4, 2025

(54) ACTIVE NOISE REDUCTION CONTROL FOR NON-OCCLUDING WEARABLE AUDIO DEVICES

(71) Applicant: Bose Corporation, Framingham, MA (US)

(72) Inventors: Brandon Lee Olmos, Allston, MA (US); Lei Cheng, Wellesley, MA (US); Ray Scott Wakeland, Yorktown, IN (US); Jahn Dmitri Eichfeld, Natick, MA (US); Travis Lee Hein, Holliston, MA (US); Yashar M. Aval, Belmont, MA (US); Siamak Farahbakhsh, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 162 days.

(21) Appl. No.: 17/837,482

(22) Filed: Jun. 10, 2022

(65) Prior Publication Data

US 2023/0403496 A1 Dec. 14, 2023

(51) Int. Cl.
*H04R 1/10* (2006.01)
*G10K 11/178* (2006.01)

(52) U.S. Cl.
CPC ..... *H04R 1/1083* (2013.01); *G10K 11/17854* (2018.01); *G10K 11/17881* (2018.01); *G10K 11/17883* (2018.01); *H04R 1/1041* (2013.01); *G10K 2210/1081* (2013.01); *H04R 2420/05* (2013.01); *H04R 2460/01* (2013.01); *H04R 2460/09* (2013.01)

(58) Field of Classification Search
CPC ................ H04R 1/1083; H04R 1/1041; H04R 2420/05; H04R 2460/01; H04R 2460/09; G10K 11/17881; G10K 11/17883; G10K 11/17854; G10K 2210/1081
USPC ........................................................ 381/71.6
See application file for complete search history.

(56) References Cited

U.S. PATENT DOCUMENTS

2020/0202837 A1* 6/2020 Makino .................... H04R 1/10
2022/0130364 A1 4/2022 Makino et al.

FOREIGN PATENT DOCUMENTS

WO 2022031279 A1 2/2022

OTHER PUBLICATIONS

PCT International Search Report and Written Opinion for International Application No. PCT/US2023/024913, dated Sep. 8, 2023, 12 pages.

* cited by examiner

*Primary Examiner* — Vivian C Chin
*Assistant Examiner* — Douglas J Suthers
(74) *Attorney, Agent, or Firm* — Hoffman Warnick LLC

(57) ABSTRACT

Various implementations include audio devices and methods for noise reduction control in wearable audio devices and/or vehicle audio systems. Certain implementations include a non-occluding wearable audio device having: at least one electro-acoustic transducer; at least one microphone; and a control system coupled with the at least one electro-acoustic transducer and the at least one microphone, the control system programmed to: adjust an active noise reduction (ANR) setting for audio output to the at least one electro-acoustic transducer in response to detecting use of the non-occluding wearable audio device in a vehicle.

17 Claims, 4 Drawing Sheets

ACTIVE NOISE REDUCTION CONTROL FOR NON-OCCLUDING WEARABLE AUDIO DEVICES

TECHNICAL FIELD

This disclosure generally relates to audio systems. More particularly, the disclosure relates to controlling noise reduction in wearable audio devices and/or vehicle audio systems.

BACKGROUND

Certain automobile audio systems are configured to reduce road and/or ambient noise for passengers. However, many of these conventional systems are limited in their range of noise control as well as types of noise that can be effectively controlled.

SUMMARY

All examples and features mentioned below can be combined in any technically possible way.

Various implementations include approaches for active noise reduction control in wearable audio devices. Additional implementations include approaches for noise control in a vehicle audio system using an input from a wearable audio device. Further approaches include controlling active noise reduction in a wearable audio device and/or noise control in a vehicle audio system based on data from one of the other systems.

In some particular aspects, a non-occluding wearable audio device includes: at least one electro-acoustic transducer; at least one microphone; and a control system coupled with the at least one electro-acoustic transducer and the at least one microphone, the control system programmed to: adjust an active noise reduction (ANR) setting for audio output to the at least one electro-acoustic transducer in response to detecting use of the non-occluding wearable audio device in a vehicle.

In additional particular aspects, a vehicle audio system includes: at least one electro-acoustic transducer; at least one microphone; and an audio control system coupled with the at least one electro-acoustic transducer and the at least one microphone, the control system programmed to: adjust a noise control (NC) setting for audio output to the at least one electro-acoustic transducer in response to detecting use of a non-occluding wearable audio device in the vehicle.

In further particular aspects, a method of controlling a noise cancelation (NC) setting at a vehicle audio system and an active noise reduction (ANR) setting at a non-occluding wearable audio device includes: adjusting at least one of the NC setting at the vehicle audio system or the ANR setting at the non-occluding wearable audio device in response to detecting the presence of the non-occluding wearable audio device in the vehicle.

Implementations may include one of the following features, or any combination thereof.

In some cases, the control system is configured to communicate with an audio control system in the vehicle.

In particular aspects, the at least one microphone is configured to function as a feedforward microphone for applying ANR to an input signal at the non-occluding wearable audio device and as an error microphone for audio output by the audio control system in the vehicle. In additional implementations, the at least one microphone is configured to function as a feedback microphone for applying ANR to an input signal at the non-occluding wearable audio device.

In certain cases, the control system in the non-occluding wearable audio device and the audio control system in the vehicle are configured to coordinate audio output to reduce detectable noise by a user in the vehicle.

In some implementations, in a first frequency band, the audio control system in the vehicle is engaged to reduce the detectable noise, and in a second frequency band, the control system at the non-occluding wearable audio device is engaged to reduce the detectable noise.

In particular aspects, in the second frequency band, the audio control system in the vehicle remains engaged to reduce the detectable noise.

In certain cases, the control system or the audio control system detects data for transmitting to the other one of the control system or the audio control system to reduce the detectable noise in the first frequency band and/or the second frequency band.

In some implementations, the detected data indicates at least one of: a head position of a user of the non-occluding wearable audio device, an acoustic signature of noise in the vehicle, whether audio output is occurring in the vehicle audio system, whether audio output is occurring at the non-occluding wearable audio device, whether the user is speaking, whether another user in the vehicle is speaking, a vehicle noise parameter, or a vehicle usage parameter. In certain implementations, the wearable audio device microphone(s) provide data to the vehicle control system, including but not limited to the frequency range of sound detected for the purposes of boosting a sound management feature or further reducing noise experienced by the user. In particular examples, the vehicle noise parameter or the vehicle usage parameter can include a speed of the vehicle, whether particular systems in the vehicle are engaged (e.g., HVAC), whether a window or sunroof is open, a gear in which the vehicle is operating, revolutions per minute (RPM) of the vehicle engine, a number of occupants of the vehicle, a model of the vehicle, or a seat location of one or more listeners. In certain implementations, the microphone(s) at the WAD can enhance a noise reduction or sound management function of the vehicle audio system without functioning as an error microphone.

In certain aspects, the first frequency band and the second frequency band are distinct.

In particular cases, the first frequency band and the second frequency band overlap.

In some aspects, the control system includes an ANR circuit for noise reduction, and wherein the microphone is used as at least one of a feedforward microphone input or a feedback microphone input to the ANR circuit.

In certain implementations, the ANR circuit deploys a set of filters to audio signal inputs to reduce noise detected by the feedforward microphone, wherein the set of filters are: i) predetermined, ii) fully adaptive, or iii) a mixture of predetermined and fully adaptive. In some examples, a fully adaptive filter relies on the error microphone and/or a predictive model or simulation of the environment in the vehicle to filter the audio signals.

In particular cases, the control system applies a distinct ANR setting for audio output when the non-occluding wearable audio device is detected as not present in the vehicle. In some examples, the control system is configured to apply a distinct ANR setting for audio output when the non-occluding wearable audio device is detected as being in an open-air environment or in distinct vehicle types (e.g., distinct ANR settings for public transit vehicles as compared with a personal automobile, an airplane, a train, etc.).

In some aspects, the audio control system is configured to communicate with a control system in the non-occluding wearable audio device.

In certain cases, the control system in the non-occluding wearable audio device and the audio control system in the vehicle are configured to coordinate audio output to reduce detectable noise by a user in the vehicle.

In particular implementations, in a first frequency band, the audio control system in the vehicle is engaged to reduce the detectable noise, and wherein in a second frequency band, the control system at the non-occluding wearable audio device is engaged to reduce the detectable noise.

In further aspects, in the second frequency band, the audio control system in the vehicle remains engaged to reduce the detectable noise.

In some cases, the control system or the audio control system detects data for transmitting to the other one of the control system or the audio control system to reduce the detectable noise in the first frequency band and/or the second frequency band.

In particular implementations, the audio control system includes an NC circuit that deploys a set of filters to audio signal inputs to reduce noise detected by the microphone.

In certain aspects, the NC circuit deploys distinct filters to provide at least one of: i) seat-specific NC settings for the audio output, ii) user-specific NC settings for the audio output, iii) user-adjustable NC settings for the audio output, iv) differential user-adjustable RNC settings for the audio output in conjunction with an ANR setting on the non-occluding wearable audio device, or v) adaptable NC settings and/or audio output settings based on detecting use of the non-occluding wearable audio device in the vehicle. In some examples, the adaptable NC settings are further adjustable in response to detecting the presence of a primary user with a non-occluding wearable audio device and a secondary user without a non-occluding wearable audio device. In some of these examples, the NC circuit adjusts vehicle-level NC for the secondary user in response to this determination.

In some cases, in response to detecting that an active noise reduction (ANR) setting is applied at the non-occluding wearable audio device, the audio control system is configured to initiate at least one of: i) routing audio output from the audio control system to the non-occluding wearable audio device, ii) instructing the non-occluding wearable audio device to disable the ANR setting, or iii) applying a gain to audio output from the audio control system to offset the applied ANR setting at the non-occluding wearable audio device.

In some aspects, the NC setting can be tailored to cancel road noise and/or engine noise, tire cavity and/or cabin boom noise.

In certain implementations, the presence of the non-occluding wearable audio device is detected by a powered on presence such as a Bluetooth connection, a previous pairing connection, detecting audio output from the audio device, etc.

In particular cases, adjusting the ANR setting includes applying a narrowband feedforward or feedback control to a noise signal at the non-occluding wearable audio device based on an input from a reference sensor. In some cases, the input from the reference sensor indicates an RPM level of the vehicle or a target frequency of noise in the vehicle.

In certain cases, the reference sensor can include a microphone, an accelerometer or a strain sensor.

In some aspects, adjusting the ANR setting includes applying a broadband feedforward control to a noise signal at the non-occluding wearable audio device based on an input from a reference sensor in the vehicle.

In certain cases, at least one of the NC setting or the ANR setting is associated with a seat location in the vehicle for application when a user is detected in the seat location. In particular examples, the NC setting includes a seat-dependent adapted projection (either factoring input from the non-occluding wearable audio device or independent of input from the non-occluding wearable audio device), or a seat-dependent engine and/or motor enhancement function. In some examples, the NC setting is configured to focus audio output to a user not wearing the non-occluding wearable audio device.

In particular aspects, adjusting the ANR setting includes disabling a microphone cross-check with the NC system in response to detecting the presence of the non-occluding wearable audio device in the vehicle.

In some implementations, adjusting the ANR setting includes buffering detected road noise in an audio output at the non-occluding wearable audio device. In some examples, the audio output from the non-occluding wearable audio device is used to improve adaptation of the NC system (e.g., NC algorithm).

In certain cases, adjusting the NC system includes reducing headrest speaker commands in response to detecting user head movement to mitigate acoustic artifact detection at the non-occluding wearable audio device.

In particular aspects, a method further includes adjusting the NC setting and/or the ANR setting based on detecting a specific head location of a user of the non-occluding wearable audio device. In some examples, the specific head location is detected by sensors in a seat and/or headrest in the vehicle, a known regular user height and/or seat position, or with sensor-based feedback indicating the user head location such as feedback from a microphone (e.g., voice detection) and/or optical sensing.

In certain cases, a method further includes routing voice signals detected by the vehicle audio system to the non-occluding wearable audio device to enable in-vehicle communication.

In particular aspects, a method further includes streaming raw audio detected by at least one microphone in the non-occluding wearable audio device to the vehicle audio system for processing.

In some implementations, a method further includes detecting an error state of the vehicle audio system using an acoustic input from at least one microphone in the non-occluding wearable audio device and providing an indicator of the error state to the vehicle audio system.

In certain cases, at least one microphone at the non-occluding wearable audio device provides an acoustic input to a model of the vehicle for improving NC settings, e.g., projections and/or models of the acoustic environment in the vehicle.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
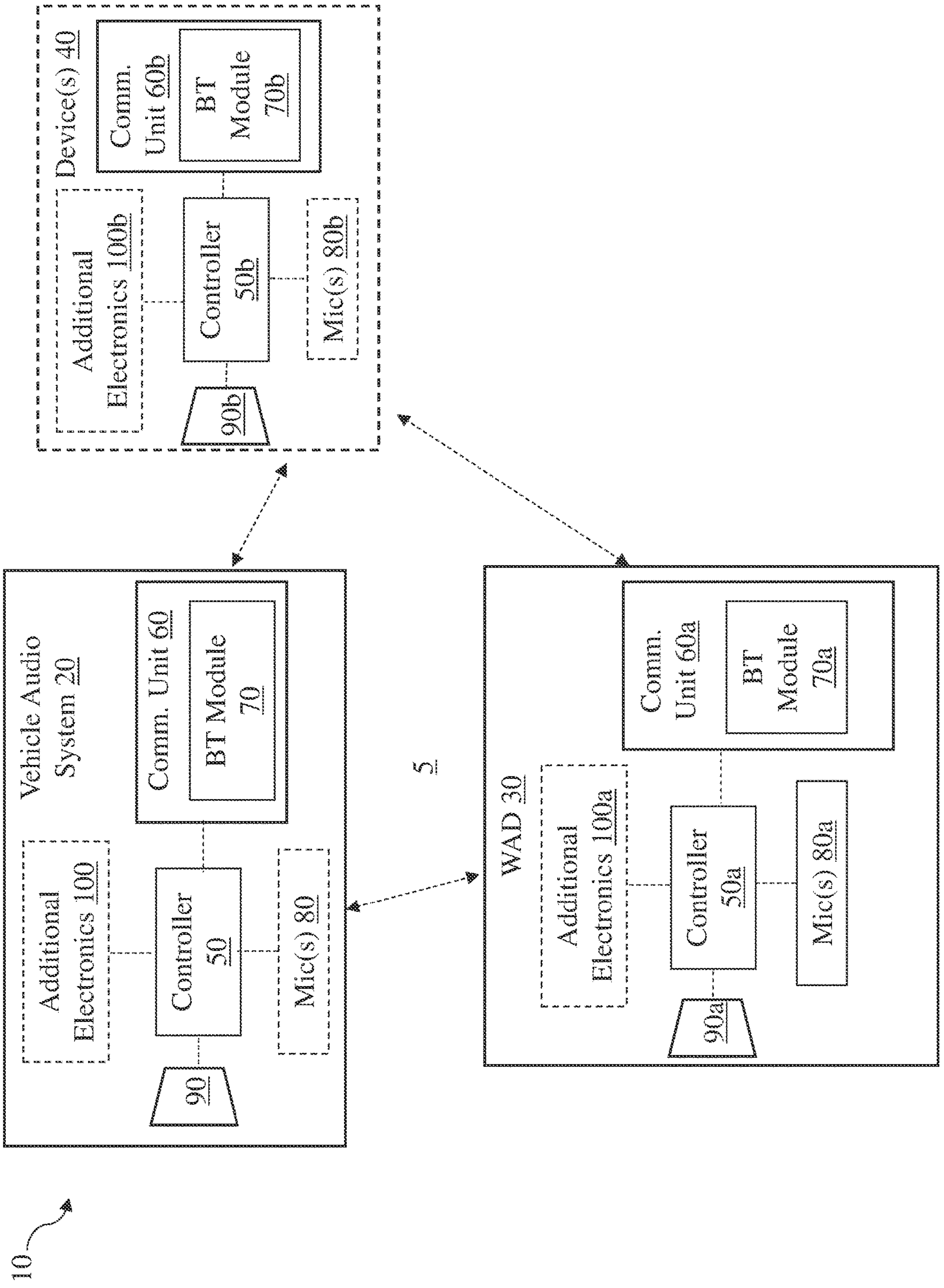
FIG. 1 is a block diagram of a system including a vehicle audio system and a non-occluding wearable audio device, according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that coordinating noise control and/or cancelation between vehicle audio systems and wearable audio devices can enhance individual user experiences, as well as a group experience. The systems and methods disclosed use a non-occluding wearable audio device to enhance noise control and/or cancelation in a vehicle. Additional systems and methods are configured to control the non-occluding wearable audio device in vehicle and non-vehicle environments, e.g., adaptively modifying the noise control functions based on device usage and/or location. In particular cases, the non-occluding wearable audio device aids in controlling noise in a vehicle, such as mid to high-frequency noise that a vehicle noise control (NC) system can struggle to control.

For example, a vehicle noise control (NC) system can reduce low-frequency noise in a vehicle (e.g., road noise detectable in a vehicle cabin and/or transmitted via the vehicle structure) such as noise in the approximately 30 Hertz (HZ) to approximately 500 Hz range, higher-frequency noise can still impact the vehicle occupants. Such relatively higher-frequency noise can include airborne noise such as wind noise, airborne tire noise, HVAC noise, high-frequency structure-borne road noise, and nearby vehicle noise.

Various implementations include a non-occluding wearable audio device (also referred to as an "open-ear" or "open ear" wearable audio device (WAD)) that includes a control system programmed to adjust an active noise reduction (ANR) setting for audio output to a transducer (or transducers) in response to detecting use of the non-occluding WAD in a vehicle. Various additional implementations include a vehicle audio system that includes an audio control system programmed to adjust a noise control (NC) setting for audio output to a transducer (or transducers) in response to detecting use of a non-occluding WAD in the vehicle. Various additional implementations include a method of controlling a NC setting at a vehicle audio system and an ANR setting at a non-occluding WAD, by adjusting the NC setting and/or the ANR setting in response to detecting the presence of the non-occluding WAD in the vehicle.

While this disclosure provides an architecture for devices such as headphones that employ ANR, an exhaustive description of ANR is omitted for brevity purposes. To the extent necessary, illustrative ANR systems are for example described in U.S. Pat. No. 8,280,066, entitled "Binaural Feedforward-based ANR" issued to Joho et al., on Oct. 2, 2012, and U.S. Pat. No. 8,184,822 "ANR Signal Processing Topology" issued to Carreras et al., on May 22, 2012, the contents of both of which are hereby incorporated by reference.

Certain solutions disclosed herein are intended to be applicable to a wide variety of personal ANR devices, i.e., devices that are structured to be at least partly worn by a user in the vicinity of at least one of the user's ears to provide ANR functionality for at least that one ear. It should be noted that although various specific implementations of personal ANR devices may include headphones, two-way communications headsets, earphones, earbuds, audio eyeglasses, wireless headsets (also known as "earsets') and ear protectors, presentation of specific implementations are intended to facilitate understanding through the use of examples, and should not be taken as limiting either the scope of disclosure or the scope of claim coverage.

Additionally, certain solutions disclosed herein can be applicable to personal ANR devices that provide two-way audio communications, one-way audio communications (i.e., acoustic output of audio electronically provided by another device), or no communications, at all. Further, what is disclosed herein is applicable to personal ANR devices that are wirelessly connected to other devices, that are connected to other devices through electrically and/or optically conductive cabling, or that are not connected to any other device, at all. These teachings can be applicable to personal ANR devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), wireless headsets (i.e., earsets), audio eyeglasses, single earphones or pairs of earphones, as well as hats, helmets, clothing or any other physical configuration incorporating one or two earpieces to enable audio communications and/or ear protection. Beyond personal ANR devices, what is disclosed and claimed herein is also meant to be applicable to the provision of ANR in relatively small spaces in which a person may sit or stand, including and not limited to, phone booths, car passenger cabins, etc.

Commonly labeled components in the FIGURES are considered to be substantially equivalent components for the purposes of illustration, and redundant discussion of those components is omitted for clarity.

FIG. 1 shows an example of a space 5 including a system 10 including a set of devices according to various implementations. In various implementations, the devices shown in system 10 include a vehicle audio system 20 and at least one non-occluding wearable audio device (WAD) 30. As noted herein, the system 10 can include multiple WAD 30 in certain implementations, for example, where the space 5 has multiple occupants each with his/her own WAD 30. One or more additional device(s) 40 are shown, which are optional in some implementations. The additional device(s) 40 can be configured to communicate with the vehicle audio system 20, WAD(s) 30 and/or other electronic devices in the space 5 using any communications protocol or approach described herein. In certain aspects, the system 10 is located in or around space 5, e.g., a vehicle cabin. In some cases, the space 5 has multiple walls and a ceiling. In particular cases, the space 5 includes the cabin of a vehicle such as a passenger vehicle (e.g., sedan, sport utility vehicle, pickup truck, etc.), a public transit vehicle such as a train, bus or ferry boat, an airplane, a ride-sharing vehicle, etc. Particular implementations benefit from usage in a vehicle having a number of seating locations, e.g., two or more seating locations in a passenger vehicle or public transit vehicle.

In various implementations, the vehicle audio system 20 includes a controller 50 and a communication (comm.) unit 60 coupled with the controller 50. In certain examples, the communication unit 60 includes a Bluetooth module 70 (e.g., including a Bluetooth radio), enabling communication with other devices over Bluetooth protocol. In certain example implementations, vehicle audio system 20 can also include one or more microphones (mic(s)) 80 (e.g., a single microphone or a microphone array), and at least one electro-acoustic transducer 90 for providing an audio output. The vehicle audio system 20 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the controller 50 and a variety of reference data; data generated during execution of any of the variety of programs performed by the controller 50; a Bluetooth connection process; and/or various updateable data for safekeeping such as paired device data, connection data, device contact information, etc. Certain of the above-noted components depicted in FIG. 1 are optional, and are displayed in phantom.

In certain cases, the controller 50 can include one or more microcontrollers or processors having a digital signal processor (DSP). In some cases, the controller 50 is referred to as control circuit(s). The controller(s) 50 may be implemented as a chipset of chips that include separate and multiple analog and digital processors. The controller 50 may provide, for example, for coordination of other components of the vehicle audio system 20, such as control of user interfaces (not shown) and applications run by the vehicle audio system 20. In various implementations, controller 50 includes a noise control module (or modules), which can include software and/or hardware for performing audio control processes described herein. For example, controller 50 can include a noise control module in the form of a software stack having instructions for controlling functions in outputting audio to one or more speakers in the system 10 according to any implementation described herein. As described herein, the controller 50, as well as other controller(s) described herein, is configured to control functions in a noise control approach according to various implementations.

The communication unit 60 can include the BT module 70 configured to employ a wireless communication protocol such as Bluetooth, along with additional network interface(s) such as those employing one or more additional wireless communication protocols such as IEEE 802.11, Bluetooth Low Energy, or other local area network (LAN) or personal area network (PAN) protocols such as WiFi. In particular implementations, communication unit 60 is particularly suited to communicate with other communication units 60 in devices 30, 40 via Bluetooth. In additional particular implementations, the communication unit 60 is configured to communicate with devices described herein using broadcast audio over a BLE or similar connection (e.g., including a proxy connection). In still further implementations, the communication unit 60 is configured to communicate with any other device in the system 10 wirelessly via one or more of: Bluetooth (BT); BT low-energy (LE) audio; broadcast (e.g., to one or more WAD(s) 30, and/or additional device 40) such as via synchronized unicast; a synchronized downmixed audio connection over BT or other wireless connection (also referred to as SimpleSync™, a proprietary connection protocol from Bose Corporation, Framingham, MA, USA); multiple transmission streams such as broadcast, for example, to allow different devices with different sets of non-occluding near-field speakers (e.g., similar to WAD 30) to simultaneously output different portions of an audio signal. In still further implementations, the communication unit 60 is configured to communicate with any other device in the system 10 via a hard-wired connection, e.g., between any two or more devices.

As noted herein, controller 50 controls the general operation of the vehicle audio system 20. For example, the controller 50 performs processes in controlling audio and data communication with additional devices (e.g., WAD 30), as well as audio output, signal processing, etc., at the FF speaker 20. In addition to the general operation, the controller 50 initiates a communication function implemented in the communication module 60 upon detecting certain triggers (or, events), described herein. The controller 50 can initiate an operation (e.g., coordination of audio output for noise control purposes) between vehicle audio system 20 and WAD(s) 30 if specific conditions are satisfied.

In certain examples, the Bluetooth module 70 enables a wireless connection using Radio Frequency (RF) communication between the vehicle audio system 20 and WAD(s) 30 (as well as additional device(s) 40, in certain implementations). The Bluetooth module 70 exchanges a radio signal including data input/output through an antenna (not shown). For example, in a transmission mode, the Bluetooth module 70 processes data by channel coding and spreading, converts the processed data into a Radio Frequency (RF) signal and transmits the RF signal. In a reception mode, the Bluetooth module 70 converts a received RF signal into a baseband signal, processes the baseband signal by de-spreading and channel decoding and restores the processed signal to data. Additionally, the Bluetooth module 70 can ensure secured communication between devices, and protect data using encryption.

As noted herein, Bluetooth-enabled devices include a Bluetooth radio or other Bluetooth-specific communication system enabling connection over Bluetooth protocol. In the example illustrated in FIG. 1, vehicle audio system 20 is a BT source device (otherwise referred to as "input device", or "host device") and WAD 30 is part of a single BT sink device (otherwise referred to as an "output device", "destination device", or "peripheral device") or includes distinct BT sink devices. Example Bluetooth-enabled source devices, include, but are not limited to, a smartphone, a tablet computer, a personal computer, a laptop computer, a notebook computer, a netbook computer, a radio, an audio system (e.g., portable and/or fixed), an Internet Protocol (IP) phone, a communication system, an entertainment system, a headset, a smart speaker, a piece of exercise and/or fitness equipment, a portable media player, an audio storage and/or playback system, a smart watch or other smart wearable device, and so forth. Example Bluetooth-enabled sink devices include, but are not limited to, a headphone, a headset, an audio speaker (e.g., portable and/or fixed, with or without "smart" device capabilities), an entertainment system, a communication system, a smartphone, a vehicle audio system, a piece of exercise and/or fitness equipment, an out-loud (or, open-air) audio device, a wearable private audio device, and so forth. Additional BT devices can include a portable game player, a portable media player, an audio gateway, a BT gateway device (for bridging BT connection between other BT-enabled devices), an audio/video (A/V) receiver as part of a home entertainment or home theater system, etc. A Bluetooth-enabled device as described herein may change its role from source to sink or sink to source depending on a specific application. As noted herein, in various implementations the vehicle audio system 20 is part of a vehicle, for example, a dedicated audio system in a vehicle for providing audio output to one or more vehicle occupants.

In various particular implementations, a first speaker in the WAD 30 is configured to output audio to a left ear of a user, and a second speaker in the WAD 30 is configured to output audio to a right ear of the user. In particular implementations, the speakers are housed in a common device (e.g., contained in a common housing), or otherwise form part of a common speaker system. For example, the WAD 30 can include in-seat or in-headrest speakers such as left/right speakers in a headrest and/or seatback portion of an entertainment seat, gaming seat, theater seat, automobile seat, etc. In certain cases, the WAD 30 is positioned within the near-field relative to the user's ears, e.g., up to approximately 30 centimeters. In some of these cases, the WAD 30 can comprise body or shoulder-worn speakers that are approximately 30 centimeters from the user's ears, or less. In other particular cases, the near-field distance is approximately 15 centimeters or less, for example, where the WAD 30 includes a head or shoulder-worn speaker system. In further particular cases, the near-field distance is approximately 10 centimeters or less, for example, where the WAD 30 includes an on-head or near-ear wearable audio device. In additional particular cases, the near-field distance is approximately 5 centimeters or less, for example, where the WAD 30 includes an on-ear wearable audio device. These example near-field ranges are merely illustrative, and various form factors can be considered within one or more of the example range of near field as noted herein.

In still further implementations, the WAD 30 can include earphones in a wearable headset that are either wirelessly coupled or have a hard-wired connection. The WAD 30 can also be part of a wearable audio device in any form factor, for example, a pair of audio eyeglasses, on-ear or near-ear audio devices, or an audio device that rests on or around the user's head and/or shoulder region. As noted herein according to particular implementations, the WAD 30 include non-occluding near-field speakers, meaning that when worn, the WAD 30 and its housing do not fully obstruct (or, occlude) the user's ear canal. That is, at least some ambient acoustic signals can pass to the user's ear canal without obstruction from the WAD 30. In additional implementations described further herein, the WAD 30 can include occluding devices (e.g., a pair of over-ear headphones or earbuds with canal sealing features) that enable hear-through (or, "aware") mode to pass ambient acoustic signals through as playback to the user's ear.

As shown in FIG. 1, the WAD 30 can include a controller 50*a* and communication unit 60*a*, (e.g., having a BT module 70*a*), enabling communication between vehicle audio system 20 and WAD 30. Additional device(s) 40 can include one or more components described with reference to vehicle audio system 20, each of which is illustrated in phantom as optional in certain implementations. Notations "a" and "b" indicate that components in devices (e.g., WAD 30, additional device 40) are physically separate from similarly labeled components in vehicle audio system 20, but can take a similar form and/or function as their labeled counterparts in the vehicle audio system 20. Additional description of these similarly labeled components is omitted for brevity. Further, as noted herein, additional WAD(s) and additional device(s) 40 can differ from vehicle audio system 20 (and each other) in terms of form factor, intended usage, and/or capability, but in various implementations, are configured to communicate with the vehicle audio system 20 according to one or more communications protocols described herein (e.g., Bluetooth, BLE, broadcast, SimpleSync, etc.).

In general, the Bluetooth module(s) 70, 70*a*, 70*b* include Bluetooth radios and additional circuitry. More specifically, the Bluetooth module(s) 70, 70*a*, 70*b* include both a Bluetooth radio and a Bluetooth LE (BLE) radio. In various implementations, presence of a BLE radio in the Bluetooth module 70 is optional. That is, as noted herein, various implementations utilize only a (classic) Bluetooth radio for connection functions. In implementations including a BLE radio, the Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae. The Bluetooth specification, i.e., Bluetooth 5.2: Low Energy, provides the FF speaker 20 with forty channels on 2 MHz spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification. Certain example approaches of Bluetooth-related pairing are described in U.S. Pat. No. 9,066,327 (issued on Jun. 23, 2015), which is incorporated by reference in its entirety. Further, approaches for selecting and/or prioritizing connection between paired devices are described in U.S. patent application Ser. No. 17/314,270 (filed May 7, 2021), which is incorporated by reference in its entirety.

As noted herein, various implementations are particularly suited for adaptive noise control (or, reduction) based on a detected presence of the WAD 30 in space 5. In certain cases, noise control is coordinated between multiple devices and/or systems, e.g., vehicle audio system 20, WAD 30, and/or additional device 40. In particular cases, the controller 50 at one or more of the systems is configured to coordinate noise control to enhance the user experience, for example, enabling a noise-reduced audio experience without sacrificing the social aspects of an open-ear audio environment. For example, the user of the WAD(s) can experience enhanced audio quality, clarity, personalization/customization, etc., when compared with listening to the vehicle audio system 20 alone, without sacrificing social engagement with other users in the same space (due to non-occluding nature of the WAD 30).

Figure 2:
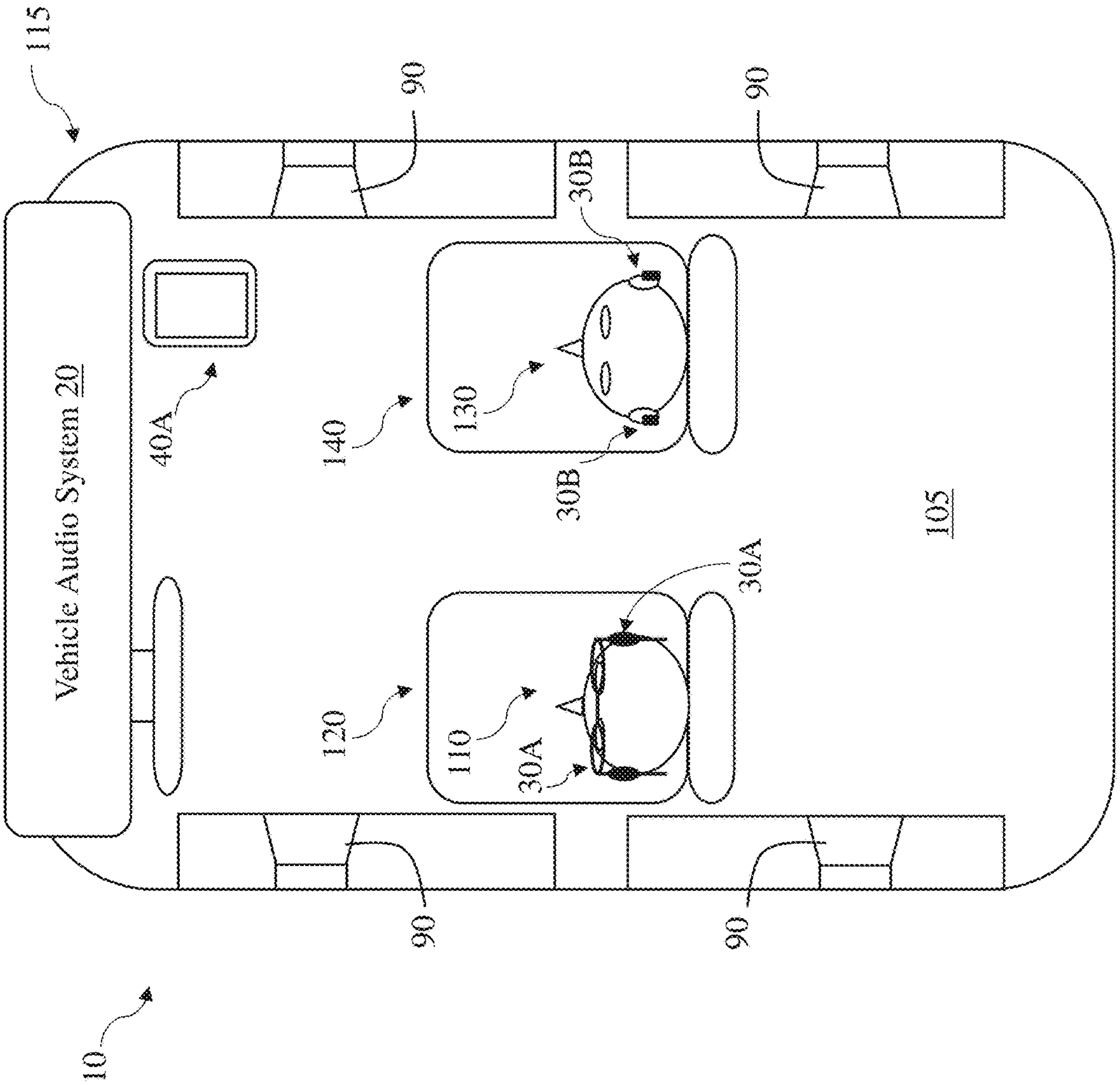
FIG. 2 is a schematic depiction of a vehicle including at least one user with a non-occluding wearable audio device according to various implementations.

FIG. 2 illustrates one implementation of an audio system 10 in a space 105 such as a vehicle cabin. In this case, the vehicle cabin is defined by a set of walls 115, which in certain cases, can define an enclosed, or partially enclosed space. This space (also referred to as "vehicle" or "vehicle cabin" herein) 105 is merely one example of various spaces that can benefit from the disclosed implementations. In this example, a first user 110 is present in a first seating location (e.g., seat 120) and a second user 130 is present in a second seating location (e.g., seat 140). In certain implementations, the vehicle audio system 20 has one or more transducers 90, which can be located in or near doors of the vehicle cabin, overhead compartments, and/or in a headrest in the cabin.

User 110 is wearing a wearable audio device 30A, which in this example includes a set of audio eyeglasses such as the Bose Frames audio eyeglasses by Bose Corporation of Framingham, MA, USA. In other cases, the wearable audio device 30A can include another open ear audio device such as a set of on-ear or near-ear headphones. In any case, the wearable audio device 30A includes a set of (e.g., two)

non-occluding NF speakers. User 130 is positioned in a seat 140 and is wearing a non-occluding WAD 30B, which can include a set of on-ear headphones such as Bose Sport Open Earbuds by Bose Corporation of Framingham, MA, USA. In this non-limiting example, an additional device 40A is present in the space 105. For example, an additional device 40A can include a smart device (e.g., a smartphone, tablet computing device, surface computing device, laptop, etc.). The devices and interaction of devices in space 105 are merely intended to illustrate some of the various aspects of the disclosure.

Figure 3:
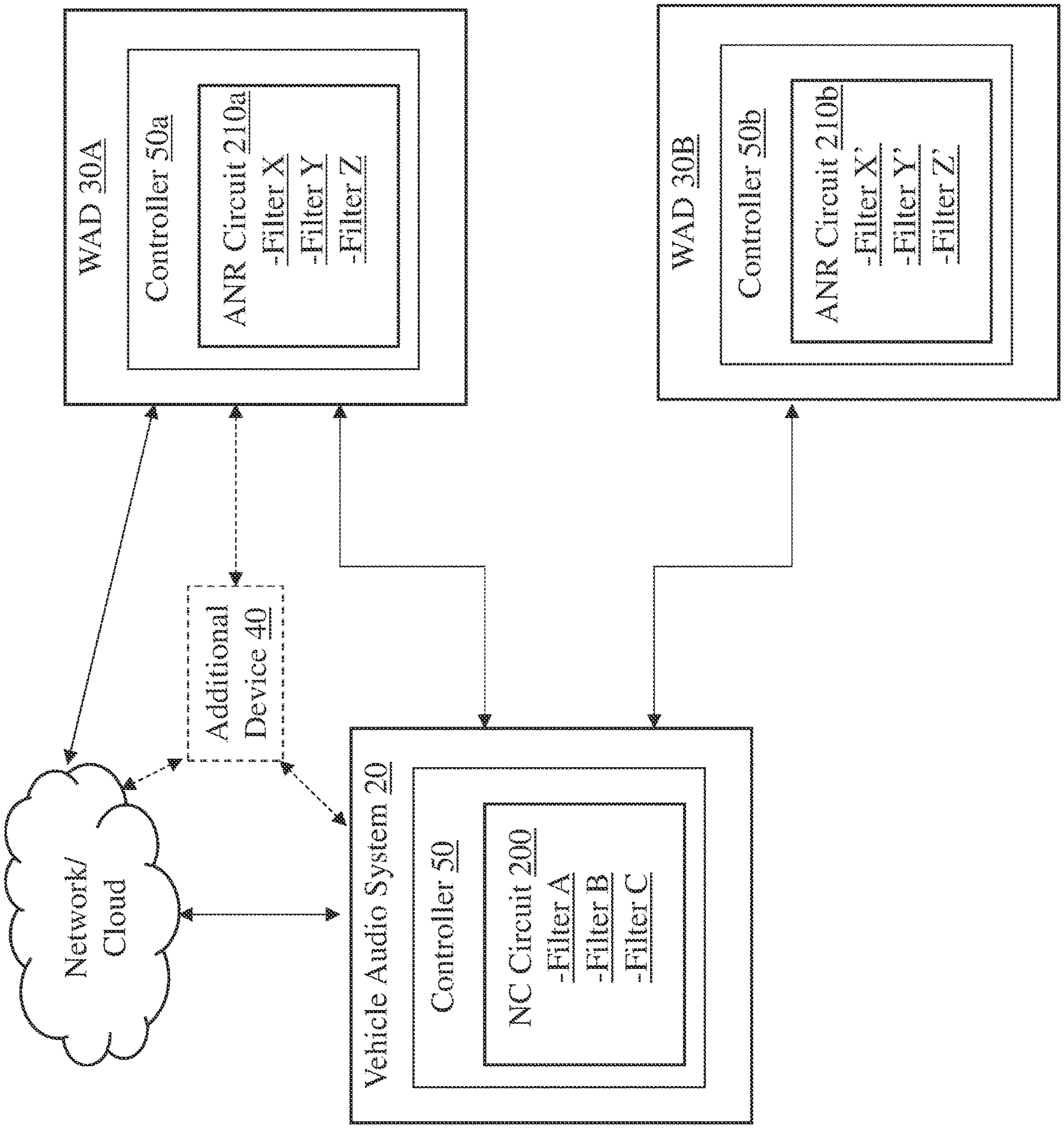
FIG. 3 is an audio signal flow diagram according to various implementations.

With reference to the illustrative example in FIG. 2, according to certain implementations, the audio system 10 is configured to control audio output in one or both of the vehicle audio system 20 and the WAD(s) 30A, 30B. FIG. 3 shows a signal flow diagram illustrating example audio signal flows in conjunction with FIG. 2. In particular cases, processes performed according to various implementations are controlled by a controller at one or more of the speakers in audio system 10, e.g., controller 50 in vehicle audio system 20 and/or controller(s) 50*a*, 50*b* in WADs 30A, 30B (FIG. 1). In certain implementations, a WAD 30 is configured to adjust an active noise reduction (ANR) setting for audio output to the transducer 90*a* in response to detecting use of the WAD 30 in the vehicle, e.g., in space 105. In various implementations, the controller 50*a* in the WAD 30 is configured to communicate with controller 50 in the vehicle audio system 20 to coordinate audio output at both devices in response to detecting the presence of the WAD 30 in the vehicle. In additional and/or alternative implementations, the controller 50 in the vehicle audio system 20 is configured to adjust a noise cancelation (NC) setting for audio output to the transducer 90 in response to detecting use of the WAD 30 in the vehicle.

Turning to FIG. 3, the controller 50 at the vehicle audio system 20 can include a noise cancelation (NC) circuit 200 having a set of filters (example, non-limiting set of Filter A, Filter B, Filter C, etc. shown), and the controller(s) 50*a,b* at one or more of the WAD 30 can include an active noise reduction (ANR) circuit 210 with a set of filters (example, non-limiting set of Filter X (X'), Filter Y (Y'), Filter Z (Z'), etc., shown). Additional examples of noise cancelation and/or ANR circuits are illustrated and described in U.S. patent application Ser. No. 16/788,365 (Computational Architecture for Active Noise Reduction Device), filed on Feb. 12, 2020, and entirely incorporated by reference herein.

In certain examples, as illustrated in FIG. 3, the vehicle audio system 20 and/or one or more of the WAD(s) 30 is connected with a network and/or cloud system such as a network-based source device and/or cloud computing system. In a non-limiting example (shown in phantom as optional), one or more devices or systems is connected to a network and/or cloud computing system via an additional device 40 such as a smart device. It is understood that the vehicle audio system 20 and/or the WAD(s) 30 can utilize a network and/or cloud connection via an additional device 40. In further implementations, the vehicle audio system 20 and/or the WAD 30 act as a source device, for example, with integrated network and/or cloud communications capabilities. In one example illustrated in FIG. 3, the vehicle audio system 20 and/or the WAD 30 are network and/or cloud-connected devices that runs a software program or software application (also called an "app") configured to manage audio output to one or more devices. In certain examples, a source device sends signals to both the vehicle audio system 20 and the WAD(s) 30. In additional examples, a source device sends signals to the vehicle audio system 20 or (one or both of) the WAD 30A, 30B, which are forwarded between those speaker connections. While particular example scenarios are described herein, the vehicle audio system 20 and WAD 30 can forward or otherwise transmit signals in any technically feasible manner, and the examples described herein (e.g., SimpleSync, broadcast, BT, etc.) should not be considered limiting of the various implementations.

In particular examples such as illustrated in FIGS. 1-3, the microphone(s) 80*a* in the WAD 30 is configured to function as a feedforward microphone for applying ANR to an input signal at the ANR circuit 210*a* of WAD 30 and as an error microphone for audio output by the vehicle audio system 20 as controlled by controller 50. In additional implementations, the microphone(s) 80*a* is configured to function as a feedback microphone for applying ANR to the input signal at the ANR circuit 210*a* in WAD 30A.

In certain cases, the controller 50*a* in the WAD 30 and the controller 50 in the vehicle audio system 20 are configured to coordinate audio output (e.g., at one or both systems) to reduce detectable noise by a user in the vehicle (e.g., user 110 and/or user 130, FIG. 2). In some implementations, in a first frequency band (or range), the controller 50 in the vehicle audio system 20 is engaged to reduce the detectable noise, and in a second frequency band (or range), the controller 50 at the WAD 30 is engaged to reduce the detectable noise. In particular examples, the first frequency band and the second frequency band overlap. In other examples, the first frequency band and the second frequency band are distinct. According to certain implementations, the vehicle audio system 20 and the WAD 30 communicate to coordinate noise cancelation and/or noise reduction based on a detected frequency of noise in or around the vehicle cabin 105. In particular aspects, in the second frequency band, the vehicle audio system 20 remains engaged to reduce the detectable noise. In these examples, the first frequency band is a relatively lower frequency band than the second frequency band. For example, the first frequency band is approximately 30 Hz to approximately 500 Hz, and the second frequency band is approximately 500 Hz to approximately 2 kHz or approximately 3 kHz. In certain cases, the second frequency band is approximately 200 Hz to approximately 2 kHz, and in some cases the first frequency band and the second frequency band overlap. In particular cases, the NC circuit 200 in the vehicle audio system 20 is engaged in response to detecting noise in the first frequency band (e.g., approximately 30 Hz to approximately 500 Hz), and the ANR circuit 210*a* in WAD 30 is engaged in response to detecting noise in the second frequency band (e.g., approximately 200 Hz to approximately 2 kHz). In some of these examples, the NC circuit 200 remains engaged, i.e., canceling relatively lower frequency noise, even while the ANR circuit 210*a* in the WAD is engaged in canceling relatively higher frequency noise. As noted herein, the non-occluding nature of the WAD 30 can limit the amount of effective noise cancelation available for the device, and coordination of noise control by the NC circuit 200 can aid in reducing detectable noise for the user 110.

In certain cases, controller 50*a* in the WAD 30 and/or the controller 50 in the vehicle audio system 20 detects data for transmitting to the other controller 50, 50*a* to reduce the detectable noise in the first frequency band and/or the second frequency band. For example, detected data can be obtained from one or more sensors at the system 20 and/or device 30, e.g., microphone(s) 80, and/or additional electronics 100 (e.g., sensors such as IMUs, accelerometers/gyroscope/magnetometers, optical sensors, voice activity detection systems). In some implementations, the detected data indicates at least one of: a head position of a user of the WAD 30 (e.g., user 110, FIG. 2), an acoustic signature of noise in the vehicle 105, whether audio output is occurring in the vehicle audio system 20, whether audio output is occurring at the WAD 30, whether the user 110 is speaking, whether another user 130 in the vehicle 105 is speaking, a vehicle noise parameter, or a vehicle usage parameter. In certain implementations, the WAD microphone(s) 80*a* provide data to the vehicle audio system 20, including but not limited to the frequency range of sound detected for the purposes of boosting a sound management feature or further reducing noise experienced by the user 110. In particular examples, the vehicle noise parameter or the vehicle usage parameter can include a speed of the vehicle, whether particular systems in the vehicle are engaged (e.g., HVAC), whether a window or sunroof is open, a gear in which the vehicle is operating, revolutions per minute (RPM) of the vehicle engine, a number of occupants of the vehicle, a model of the vehicle, or a seat location of one or more listeners. In various implementations, the controller 50 at the vehicle audio system 20 and/or the controller 50*a* at the WAD 30 is configured to receive data from a central vehicle controller or a vehicle interface indicating at least one of the vehicle noise parameters or vehicle usage parameters.

In certain implementations, the microphone(s) 80*a* at the WAD 30 can enhance a noise reduction or sound management function of the vehicle audio system 20 without functioning as an error microphone. Additionally, while various example implementations describe the microphone(s) 80*a* at the WAD 30 as used in a feedforward microphone input to the ANR circuit 210*a*, in additional cases, the microphone(s) 80*a* at the WAD 30 are used for feedback microphone input to the ANR circuit 210*a*.

In some examples where the microphone(s) 80*a* act as feedback microphone inputs to the ANR circuit 210, it may be beneficial for physical placement of microphone(s) 80 in the WAD 30 to be relatively closer to the transducer(s) 90*a* than in a strictly feedforward configuration, e.g. to aid microphone(s) 80 in detecting output from the transducer(s) 90*a*. In contrast, where the WAD 30 is configured to use microphone(s) 80 in strictly a feedforward configuration, the microphone(s) 80 are physically located in a location of a pressure null relative to the transducer(s) 90 such that acoustic coupling (or, feedback) between the microphone(s) 80 and transducer(s) 90 is limited. However, certain configurations of the WAD 30 can enable both feedforward and feedback configurations of the microphone inputs, and in particular cases, distinct microphone inputs (e.g., distinct sub-microphones 80*a*) can be used to achieve both feedforward and feedback benefits.

As noted herein, the ANR circuit 210*a* (FIG. 3) is configured to deploy a set of filters (Filter X, Filter Y, Filter Z) to reduce noise detected by the feedforward microphone 80*a*. In certain implementations, the set of filters are: i) predetermined, ii) fully adaptive, or iii) a mixture of predetermined and fully adaptive. In some examples, a fully adaptive filter relies on the use of the microphone(s) 80*a* as an error microphone and/or a predictive model or simulation of the environment in the vehicle 105 to filter the audio signals. Additional details of adaptive filters in ANR circuits are included in U.S. Pat. No. 9,633,647 (Self-Tuning Transfer Function for Adaptive Filtering) filed Oct. 4, 2016, which is entirely incorporated by reference herein.

In particular cases, the controller 50*a* applies a distinct ANR setting (e.g., distinct filters and/or subsets of filters) for audio output when the WAD 30 is detected as not present in the vehicle 105. That is, the controller 50*a* is configured to adjust an ANR setting at the WAD 30 based on the detected location of the WAD 30, in particular, based on a detected presence in the vehicle 105. In some examples, the controller 50*a* is configured to apply a distinct ANR setting for audio output when the WAD 30 is detected as being in an open-air environment or in distinct vehicle types (e.g., distinct ANR settings for public transit vehicles as compared with a personal automobile, an airplane, a train, etc.).

As noted herein and illustrated in FIG. 3, the vehicle audio system 20 can include NC circuit 200 for deploying a set of filters (e.g., Filter A, Filter B, Filter C, etc.) to audio signal inputs to reduce noise detected by the microphone 80. In certain aspects, the NC circuit 200 deploys distinct filters (e.g., specific filters and/or sub-sets of filters) to provide at least one of: i) seat-specific NC settings for the audio output, ii) user-specific NC settings for the audio output, iii) user-adjustable NC settings for the audio output, iv) differential user-adjustable NC settings for the audio output in conjunction with an ANR setting on the WAD 30, or v) adaptable NC settings and/or audio output settings based on detecting use of the WAD 30 in the vehicle 105. For example, the NC circuit 200 can include NC settings (e.g., filter selections and/or combinations) that provide seat-specific NC settings for the audio output from the transducer 90, e.g., NC settings that enhance noise reduction for audio output to a particular seat or seats in the vehicle. In other examples, the NC circuit 200 includes NC settings that provide user-specific NC settings for the audio output from transducer 90, e.g., NC settings attributable to a known user or users (where user information is detectable based on visual identification, voice signature, detected proximity of known device belonging to the user, etc.). In still further examples, the NC circuit 200 includes NC settings that are user-adjustable, e.g., via an interface at the vehicle control system or via an application running on the WAD 30 and/or a smart device such as one of the additional device(s) 40 (FIG. 1). In additional examples, the NC circuit 200 includes NC settings that are adjustable based on an ANR setting on a WAD 30 worn by the user, e.g., user 110. In these cases, the NC settings are adjusted based on a change in the ANR settings on the WAD 30. In further examples, the NC circuit 200 includes NC settings and/or audio output settings that are adaptable based on usage of the WAD 30 in the vehicle 105, e.g., the NC settings are adjusted in response to detecting use of the WAD 30 in the vehicle 105.

In some examples, the adaptable NC settings are further adjustable in response to detecting the presence of a primary user (e.g., user 110, FIG. 2) with a non-occluding WAD 30 and a secondary user (not shown) without a non-occluding WAD 30. In some of these examples, the NC circuit 200 adjusts vehicle-level NC for the secondary user in response to this determination. For example, the NC circuit 200 can reduce noise cancelation of the audio output at transducer 90 for the secondary user in response to determining that the primary user is using the WAD 30.

In some cases, in response to detecting that an ANR setting is applied at the (non-occluding) WAD 30, the vehicle audio system 20 is configured to initiate at least one of: i) routing audio output from the vehicle audio system 20 to WAD 30, ii) instructing the WAD 30 to disable the ANR setting, or iii) applying a gain to audio output from the vehicle audio system 20 to offset the applied ANR setting at the WAD 30.

In some aspects, the NC setting (applied by NC circuit 200) can be tailored to cancel road noise and/or engine noise, tire cavity and/or cabin boom noise. Further description of NC settings and noise control in automobiles is described in U.S. Pat. No. 10,839,786 (Systems and Methods for Canceling Road Noise in a Microphone Signal), filed Jun. 17, 2019, and U.S. Pat. No. 9,928,823 (Adaptive Transducer Calibration for Fixed Feedforward Noise Attenuation Systems), filed Aug. 12, 2016, each of which is entirely incorporated by reference herein.

In certain implementations, the presence of the (non-occluding) WAD 30 is detected by a powered on presence such as a BT connection, a previous pairing connection, or detecting audio output from the WAD 30. For example, the controller 50 at the vehicle audio system 20 can detect a BT connection with the WAD 30 or a BT proximity with the WAD 30 (via the communication unit 60). In additional examples, the controller 50*a* at the WAD 30 communicates with controller 50 at the vehicle audio system 20 to indicate state changes, e.g., to indicate that audio output is occurring at the WAD 30. Any one or more of the above-noted examples can indicate to the vehicle audio system 20 that the WAD 30 is present in the vehicle 105.

In particular cases, adjusting the ANR setting (e.g., at ANR circuit 210*a*) includes applying a narrowband feed-forward or feedback control to a noise signal at the (non-occluding) WAD 30 based on an input from a reference sensor. In some cases, the input from the reference sensor indicates an RPM level of the vehicle or a target frequency of noise in the vehicle cabin 105, e.g., as indicated by an input from microphone(s) 80. In certain cases, the reference sensor can include a microphone (e.g., microphone(s) 80, 80*a*, etc.), an accelerometer (e.g., an IMU in the additional electronics 100*a* in the WAD 30) or a strain sensor (e.g., in the additional electronics 100*a* in the WAD 30). In some additional aspects, adjusting the ANR setting at ANR circuit 210*a* includes applying a broadband feedforward control to a noise signal at the WAD 30 based on an input from a reference sensor in the vehicle cabin 105. The reference sensor for the feedforward control can include one or more of the same reference sensors used in the narrowband ANR setting adjustment, or can include distinct reference sensors. Examples of narrowband noise include engine and/or motor harmonics, noise from detection systems such as LiDAR motor(s), tire cavity resonance, cabin boom noise and/or compressor (e.g., air conditioning compressor) noise. Examples of broadband noise that the system is capable of controlling (and in some cases canceling) include road noise such as structure-borne road noise. In particular examples, tire cavity resonance and cabin boom are tonal subsets of broadband noise, even though generally classified as narrowband noise. In certain implementations, one or more portions of the system 10 are configured to focus noise cancelation on narrowband noise, enhancing cancelation within the relatively narrower band of noise (as compared with broadband cancelation).

With reference to FIG. 3, in further implementations, the NC setting (at NC circuit 200) or the ANR setting (at ANR circuit 210*a*) is associated with a seat location in the vehicle cabin 105 (e.g., seat 120 or seat 140) for application when a user is detected in the seat location. For example, the controller 50 is configured to adjust an NC setting and/or controller 50*a* is configured to adjust an ANR setting in response to detecting the presence of a user in a seat location, e.g., user 110 in seat 120 or user 130 in seat 140. In particular examples, the NC setting includes a seat-dependent adapted projection (either factoring input from the WAD 30 or independent of input from the WAD 30), or a seat-dependent engine and/or motor enhancement function. For example, a user (e.g., user 130) may prefer to hear engine and/or motor sounds that can be effectively reduced with the NC circuit 200, and as such, the NC circuit 200 and the controller 50 adjust the audio output to reduce noise cancelation of those sounds to seat 140. In some examples, the NC setting is configured to focus audio output to a user not wearing the WAD 30, e.g., a user in seats 120, 140, etc. that is not wearing a WAD 30.

In particular examples, adjusting the ANR setting (at ANR circuit 210*a*) includes disabling a microphone cross-check with the NC system (NC circuit 200) in response to detecting the presence of the WAD 30 in the vehicle cabin 105. In these cases, the ANR circuit 210 disables a microphone input from mic(s) 80 at the vehicle audio system 20. In certain cases, disabling microphone input(s) can enhance system robustness, for example, by reducing reliance on microphones that are capable of failure.

In additional examples, adjusting the ANR setting (at ANR circuit 210*a*) includes buffering detected road noise in an audio output at WAD 30. In some examples, the audio output from the WAD 30 is used to improve adaptation of the NC system (e.g., a NC algorithm running at the NC circuit 200). In certain cases, adjusting the NC setting (at NC circuit 200) includes reducing headrest speaker commands in response to detecting user head movement to mitigate acoustic artifact detection at the WAD 30. In these cases, the vehicle audio system 20 receives an indicator that the user's head is moving or has moved relative to the seat (e.g., user 110 looks left or right in seat 120), and the based on that indicator, the controller 50 reduces headrest speaker output to mitigate acoustic artifact detection at the WAD 30. In some cases, the user head location and/or movement is detected based on a sensor input such as an input from an optical sensor, acoustic sensor (e.g., microphone), and/or sensors in the seats 120, 140. Examples of seat-based sensors such as capacitive sensors are described in U.S. patent application Ser. No. 16/916,308 (Automobile Seat with User Proximity Tracking), filed on Jun. 30, 2020, the entirety of which is incorporated herein.

Figure 4:
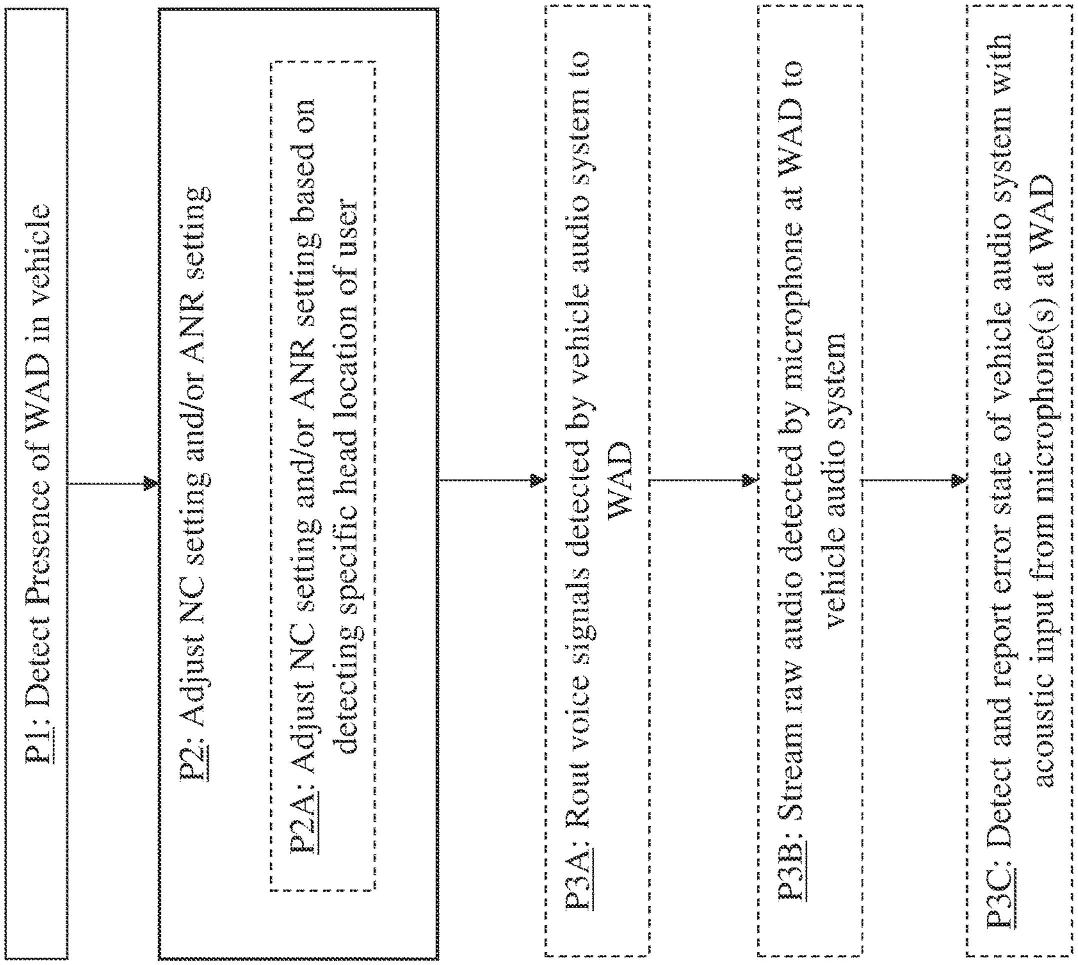
FIG. 4 is an flow diagram illustrating a method according to various additional implementations.

FIG. 4 illustrates a method of controlling a NC setting (e.g., at NC circuit 200) and/or an ANR setting (e.g., at ANR circuit 210*a*, ANR circuit 210*b*, etc.) according to certain implementations. FIG. 4 is referred to concurrently with the remaining FIGURES. Processes shown in FIG. 4 can be performed in a distinct order, or concurrently. In particular, processes indicated with notations A, B and C can be considered alternatives, or such processes can be performed concurrently or in any feasible order. As shown, the method can include in process P1, detecting the presence of a WAD (e.g., WAD 30) in a vehicle (e.g., vehicle space 105). Following detection of the WAD 30 in process P1, in process P2 the system 10 is configured to adjust the NC setting (at NC circuit 200) and/or the ANR setting (at ANR circuit 210).

In some cases as noted herein, the process of adjusting the NC setting and/or ANR setting (process P2) is further based on additional inputs to one or more systems. For example, process P2 can include one or more of the following sub-processes: P2A, adjusting the NC setting and/or the ANR setting based on detecting a specific head location of a user of the WAD 30. As described herein, specific head location for a user can be indicated by sensors in a seat and/or headrest in the vehicle, a known regular user height and/or seat position, or with sensor-based feedback indicating the user head location such as feedback from a microphone (e.g., voice detection) and/or an optical sensor in the vehicle.

In additional cases, in an optional process P3A, the method further includes routing voice signals detected by the vehicle audio system 200 to the WAD 30 to enable in-vehicle communication. In such cases, detected voice signals picked up at the microphone(s) 80 in the vehicle audio system 200 are sent to the WAD 30 for output to the user (e.g., user 110) to enable and/or enhance in-vehicle communication between users, e.g., user 110 and user 130.

In an additional optional process P3B, the method further includes streaming raw audio detected by at least one microphone 80*a* in the WAD 30 to the vehicle audio system 200 for processing. In certain implementations, processing of the raw audio by controller 50 can accomplish at least one of the following for one or more of occupant(s) 110 and 130 to improve controller 50 adaptation and NC performance: i) computation of an error signal at the ear location, ii) establishing a feedback path into controller 50 to establish feedback NC, iii) improving the a priori projection of mic(s) 80 to occupant(s) 110 and 130 to locations 30A and 30B, iv) computing performance metrics to monitor quality of NC performance, v) detecting instability in the performance of controller 50 due to system defects such as occluded mic(s) 80, vi) collecting audio information that may be stored remotely via network/cloud and used for driving offline improvements to controller 50 for example through training of machine learning algorithms. In an additional optional process P3C, the method further includes detecting an error state of the vehicle audio system 200 using an acoustic input from at least one microphone 80*a* in the WAD 30 and providing an indicator of the error state to the vehicle audio system 200. In certain cases, as noted herein, at least one microphone 80*a* at the WAD 30 provides an acoustic input to a model of the vehicle for improving NC settings, e.g., projections and/or models of the acoustic environment in the vehicle 105.

While various implementations include description of non-occluding variations of WADs 30A, 30B, in additional implementations, the WAD 30 can include an occluding near-field speaker such as over-ear or in-ear headphones operating in a transparency (or, hear-through) mode. For example, a pair of headphones that have passive and/or active noise canceling capabilities can be substituted for the non-occluding variation of WAD 30 described herein. In these cases, the occluding WAD can operate in a shared experience (or, social) mode, which can be enabled via a user interface command and/or any trigger described herein. In particular examples, the transparency (or, hear-through) mode enables the user to experience a version of the ambient audio in the vehicle 105 (i.e., via recreated acoustic pressure at the transducer(s)) while also experiencing the audio output from WAD 30.

In any case, the approaches described according to various implementations have the technical effect of enhancing noise control for a user in an environment by utilizing both a near-field (non-occluding) wearable audio device and a vehicle audio system. For example, the approaches described according to various implementations coordinate audio output at distinct speaker systems to enhance individual user experiences, as well as a group experience. The systems and methods described according to various implementations allow a user of non-occluding wearable audio devices (e.g., a wearable audio device not occluding the ear canal) to have a personalized audio experience without sacrificing the social aspects of an open-ear audio environment. Additionally, because regulations in certain jurisdictions prohibit use of occluding wearable audio devices in vehicles (e.g., as vehicle operators), the approaches described herein aid in desirable noise cancelation while maintaining a compliant, open-ear usage for the vehicle operator. Additionally, the user of the non-occluding wearable audio device can experience enhanced audio quality, clarity, personalization/customization, etc., when compared with listening to a vehicle audio system alone, without sacrificing social engagement with other users in the same space and/or situational awareness (due to non-occluding nature near-field speakers). Further, the systems and methods described herein allow both the wearable audio device and the vehicle audio system to benefit from data detected by the other system, e.g., sensor data about the user, the environment, and/or usage of the vehicle and/or the wearable audio device. These systems and methods also allow users in the same space to share a common audio experience, namely, the audio content output via the vehicle audio system, while still enabling customization of the audio content output at the wearable audio device.

Various wireless connection scenarios are described herein. It is understood that any number of wireless connection and/or communication protocols can be used to couple devices in a space, e.g., space 105 (FIG. 2). Examples of wireless connection scenarios and triggers for connecting wireless devices are described in further detail in U.S. patent application Ser. No. 17/714,253 (filed on Apr. 4, 2022) and Ser. No. 17/314,270 (filed on May 7, 2021), each of which is hereby incorporated by reference in its entirety).

The above description provides embodiments that are compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the coordinated audio output aspects according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A non-occluding wearable audio device, comprising:
at least one electro-acoustic transducer;
at least one microphone; and
a control system coupled with the at least one electro-acoustic transducer and the at least one microphone, the control system programmed to:
adjust an active noise reduction (ANR) setting for audio output to the at least one electro-acoustic transducer in response to detecting use of the non-occluding wearable audio device in a vehicle, and
communicate with an audio control system in the vehicle, wherein the control system in the non-occluding wearable audio device and the audio control system in the vehicle are configured to coordinate audio output to reduce detectable noise by a user in the vehicle,
wherein, in a first frequency band, the audio control system in the vehicle is engaged to reduce the detectable noise, and
wherein the at least one microphone is configured to function as a feedforward microphone for applying ANR to an input signal at the non-occluding wearable audio device and as an error microphone for audio output by the audio control system in the vehicle.

2. The non-occluding wearable audio device of claim 1, wherein in a second frequency band, the control system at the non-occluding wearable audio device is engaged to reduce the detectable noise.

3. The non-occluding wearable audio device of claim 2, wherein the first frequency band and the second frequency band overlap.

4. The non-occluding wearable audio device of claim 2, wherein the first frequency band and the second frequency band exclude one another.

5. The non-occluding wearable audio device of claim 2, wherein the first frequency band is approximately 30 Hertz (Hz) to approximately 500 Hz, and wherein the second frequency band is approximately 500 Hz to approximately 3 kilo-Hertz (kHz).

6. The non-occluding wearable audio device of claim 2, wherein the first frequency band is approximately 30 Hertz (Hz) to approximately 500 Hz, and wherein the second frequency band is approximately 200 Hz to approximately 2 kilo-Hertz (kHz).

7. The non-occluding wearable audio device of claim 2, wherein the control system is configured to control engagement and disengagement of a noise cancelation circuit in the audio control system in the vehicle based on detecting noise in the first frequency band or detecting noise in the second frequency band.

8. The non-occluding wearable audio device of claim 1, wherein the control system includes an ANR circuit for noise reduction, and wherein the microphone is used as at least one of a feedforward microphone input or a feedback microphone input to the ANR circuit, wherein the ANR circuit deploys a set of filters to audio signal inputs to reduce noise detected by the feedforward microphone, wherein the set of filters are: i) predetermined, ii) fully adaptive, or iii) a mixture of predetermined and fully adaptive.

9. A vehicle audio system comprising:
at least one electro-acoustic transducer;
at least one microphone; and
an audio control system coupled with the at least one electro-acoustic transducer and the at least one microphone, the control system programmed to:
adjust a noise control (NC) setting for audio output to the at least one electro-acoustic transducer in response to detecting use of a non-occluding wearable audio device in the vehicle, and
communicate with an audio control system in the non-occluding wearable audio device, wherein the control system in the non-occluding wearable audio device and the audio control system in the vehicle are configured to coordinate audio output to reduce detectable noise by a user in the vehicle,
wherein, in a first frequency band, the audio control system in the vehicle is engaged to reduce the detectable noise; and
wherein the audio control system includes an NC circuit that deploys a set of filters to audio signal inputs to reduce noise detected by the microphone, wherein the NC circuit deploys distinct filters to provide at least one of:
i) seat-specific NC settings for the audio output, ii) user-specific NC settings for the audio output, iii) user-adjustable NC settings for the audio output, iv) differential user-adjustable road noise cancelation (RNC) settings for the audio output in conjunction with an active noise reduction (ANR) setting on the non-occluding wearable audio device, or v) adaptable NC settings and/or audio output settings based on detecting use of the non-occluding wearable audio device in the vehicle.

10. The system of claim 9, wherein in a second frequency band, the control system at the non-occluding wearable audio device is engaged to reduce the detectable noise.

11. The system of claim 9, wherein the control system or the audio control system detects data for transmitting to the other one of the control system or the audio control system to reduce the detectable noise in the first frequency band and/or a second frequency band, wherein the detected data indicates at least one of: a head position of a user of the non-occluding wearable audio device, an acoustic signature of noise in the vehicle, whether audio output is occurring in the vehicle audio system, whether audio output is occurring at the non-occluding wearable audio device, whether the user is speaking, whether another user in the vehicle is speaking, or a vehicle usage parameter.

12. The system of claim 9, wherein the audio control system in the vehicle applies a distinct NC setting for audio output when the non-occluding wearable audio device is detected as not present in the vehicle.

13. The system of claim 9, wherein in response to detecting that an active noise reduction (ANR) setting is applied at the non-occluding wearable audio device, the audio control system is configured to initiate at least one of: i) routing audio output from the audio control system to the non-occluding wearable audio device, ii) instructing the non-occluding wearable audio device to disable the ANR setting, or iii) applying a gain to audio output from the audio control system to offset the applied ANR setting at the non-occluding wearable audio device.

14. A method of controlling a noise cancelation (NC) setting at a vehicle audio system and an active noise reduction (ANR) setting at a non-occluding wearable audio device, the method comprising:

adjusting at least one of the NC setting at the vehicle audio system or the ANR setting at the non-occluding wearable audio device in response to detecting the presence of the non-occluding wearable audio device in the vehicle, wherein adjusting the ANR setting includes either:

a) applying a narrowband feedforward or feedback control to a noise signal at the non-occluding wearable audio device based on an input from a reference sensor, wherein the narrowband noise includes at least one of engine noise or motor harmonics or b) applying a broadband feedforward control to a noise signal at the non-occluding wearable audio device based on an input from a reference sensor in the vehicle, wherein at least one microphone at the non-occluding wearable audio device provides an acoustic input to a model of the vehicle for improving NC settings.

15. The method of claim 14, wherein at least one of the NC setting or the ANR setting is associated with a seat location in the vehicle for application when a user is detected in the seat location.

16. The method of claim 14, wherein adjusting the ANR setting includes either:

a) disabling a microphone cross-check with the NC system in response to detecting the presence of the non-occluding wearable audio device in the vehicle, or b) buffering detected road noise in an audio output at the non-occluding wearable audio device, and wherein adjusting the NC system includes reducing headrest speaker commands in response to detecting user head movement to mitigate acoustic artifact detection at the non-occluding wearable audio device.

17. The method of claim 14, further comprising at least one of:

a) adjusting the NC setting and/or the ANR setting based on detecting a specific head location of a user of the non-occluding wearable audio device, b) routing voice signals detected by the vehicle audio system to the non-occluding wearable audio device to enable in-vehicle communication, c) streaming raw audio detected by at least one microphone in the non-occluding wearable audio device to the vehicle audio system for processing, or d) detecting an error state of the vehicle audio system using an acoustic input from at least one microphone in the non-occluding wearable audio device and providing an indicator of the error state to the vehicle audio system.

* * * * *